INVENTOR.
RICHARD R. BOWER
BY
Christie, Parker & Hale
ATTORNEYS

Oct. 1, 1968  R. R. BOWER  3,404,248
ALIGNING AND WELDING OF PARTS
Filed March 14, 1966  3 Sheets-Sheet 3
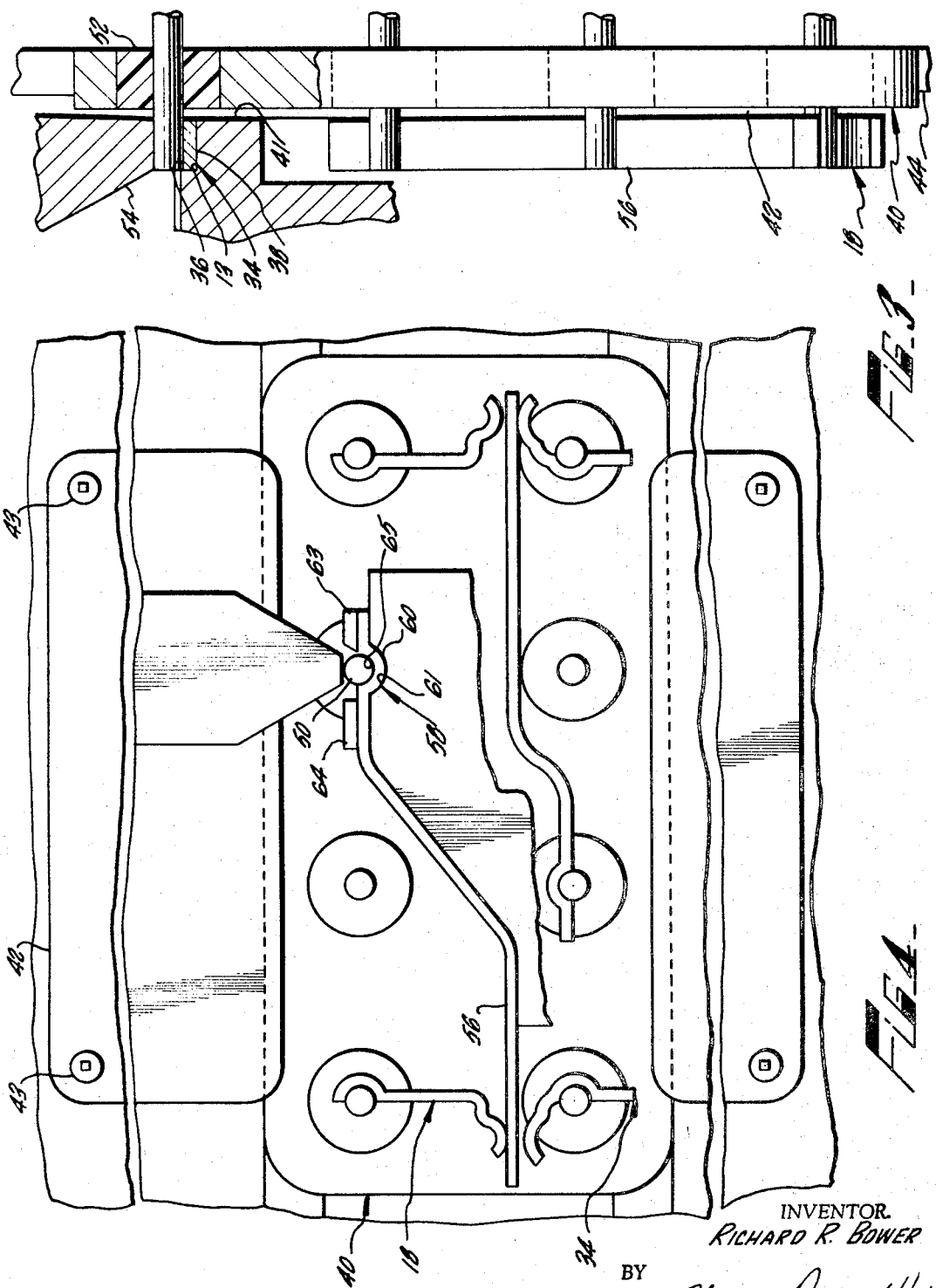
INVENTOR.
RICHARD R. BOWER
BY
Christie, Parker & Hale
ATTORNEYS United States Patent Office 3,404,248
Patented Oct. 1, 1968

3,404,248
ALIGNING AND WELDING OF PARTS
Richard R. Bower, 10012 Wilbur Ave.,
Northridge, Calif. 91324
Filed Mar. 14, 1966, Ser. No. 534,006
6 Claims. (Cl. 200—166)

ABSTRACT OF THE DISCLOSURE

As assembly having a strip of electrically-conductive material and a recess therein which is substantially longer than its transverse dimension. A post is placed in the recess and axially aligned therewith over their common length such that a weld bonds the post to the strip over a substantial portion of the area of contact between them. The method of welding and aligning the parts includes the step of forcing a length of the post which is substantially greater than its transverse dimension into the recess and thereby into axial alignment therewith. Thereafter the parts are resistance welded to each other.

This invention relates to resistance welding and an assembly made by such welding.

It is common practice to bond two metallic pieces together by "spot" or resistance welding. In such an operation, the two parts are clamped together at the point where the weld is desired, and an electric welding current is passed through two parts and the point of contact which has a relatively high resistance compared to the parts themselves. Intense heat is developed as a result of the high resistance at the point of contact, and the metals are melted and fused together to make a strong bond.

There are many applications in which more reliable products could be manufactured by resistance welding if the parts could be better aligned prior to and during the weld.

One example of the utility of this invention is in the manufacture of subminiature relay switches. Such switches typically have a baseplate through which electrically-conductive posts are sealed. Various stationary contact strips and movable blades or armature strips are resistance welded to the posts. Proper operation of the relay switch depends on accurate location and welding of the stationary and movable strips to the posts, which are sometimes misaligned with respect to the base during handling or assembling operations. This invention automatically restores any misaligned posts to proper alignment and welds the posts and strips together in the required positions relative to each other to insure good switch operation.

This invention provides an improved assembly of resistance-welded parts which are accurately aligned to a desired position relative to each other just prior to and during the welding operation. The invention also provides a method for aligning the parts accurately and welding them together.

In terms of apparatus, the invention includes a strip of electrically-conductive material having a recess in its surface. The recess has portions diverging toward the surface of the strip, and a post of electrically-conductive material is disposed in the recess. The post has converging portions which mate and are in contact over a substantial area with the diverging portions of the recess in the strip. A resistance weld bonds the post to the strip over a substantial portion of the area of contact between them.

In the preferred embodiment of the invention, the post is cylindrical and the recess is semi-cylindrical in cross section and they have the same radius of curvature. The recess preferably opens out of at least one edge of the strip to facilitate disposing the post in the recess, which preferably has a depth equal to about one-half of the diameter of the post to provide contact between the strip and post over substantially one-half of the post circumference. The recess has a length which is substantially greater than its transverse dimension. The preferred embodiment also includes a convex protrusion on the side of the strip opposite the recess to facilitate location and holding of the strip in a welding electrode specially shaped to receive the strip.

The invention also provides a method of welding together a strip and post of electrically-conductive material. The post is mounted on a base and is movable with respect to the base. A strip has a recess in its surface with portions of the recess diverging toward the surface. The post has converging portions shaped to mate with and be in contact over a substantial area with the diverging portions of the recess. The method includes holding the base in a fixed position relative to the post and disposing the post and strip adjacent each other with converging portions on the post extending into the recess and the strip. The strip and post are forced together to align the post with the recess over this common length so the converging and diverging portions are in contact with each other over a substantial area, and the post and strip are resistance welded together while they are so held in contact.

With the method just described, the converging and diverging portions of the post and strip force the parts to align themselves relative to each other so that there is maximum penetration of the post into the recess and maximum area contact between the post and strip so that the weld is made over a relatively large area, resulting in a stronger bond between the parts. Moreover, the self-aligning feature provided by the relative shapes of the posts and strip make it possible to weld the parts together with great accuracy which is important in making small precision parts, such as subminiature relay contact switches.

In the preferred method, the base and strip are moved relative to each other to bring the strip and post into contact. The base and strip are restrained against movement relative to each other in a direction transverse to the longitudinal axis of the post and transverse to the direction of movement of the post into the recess so that the post can be displaced laterally with respect to the base and forced into proper alignment with respect to the base as it enters the recess.

These and other aspects of the invention will be more fully understood from the following detailed description and the accompanying drawings, in which:

FIG. 3 is a view taken on line 3—3 of FIG. 2; and

FIG. 4 is a fragmentary elevation showing a post being welded to a moving blade strip.

Figure 1:
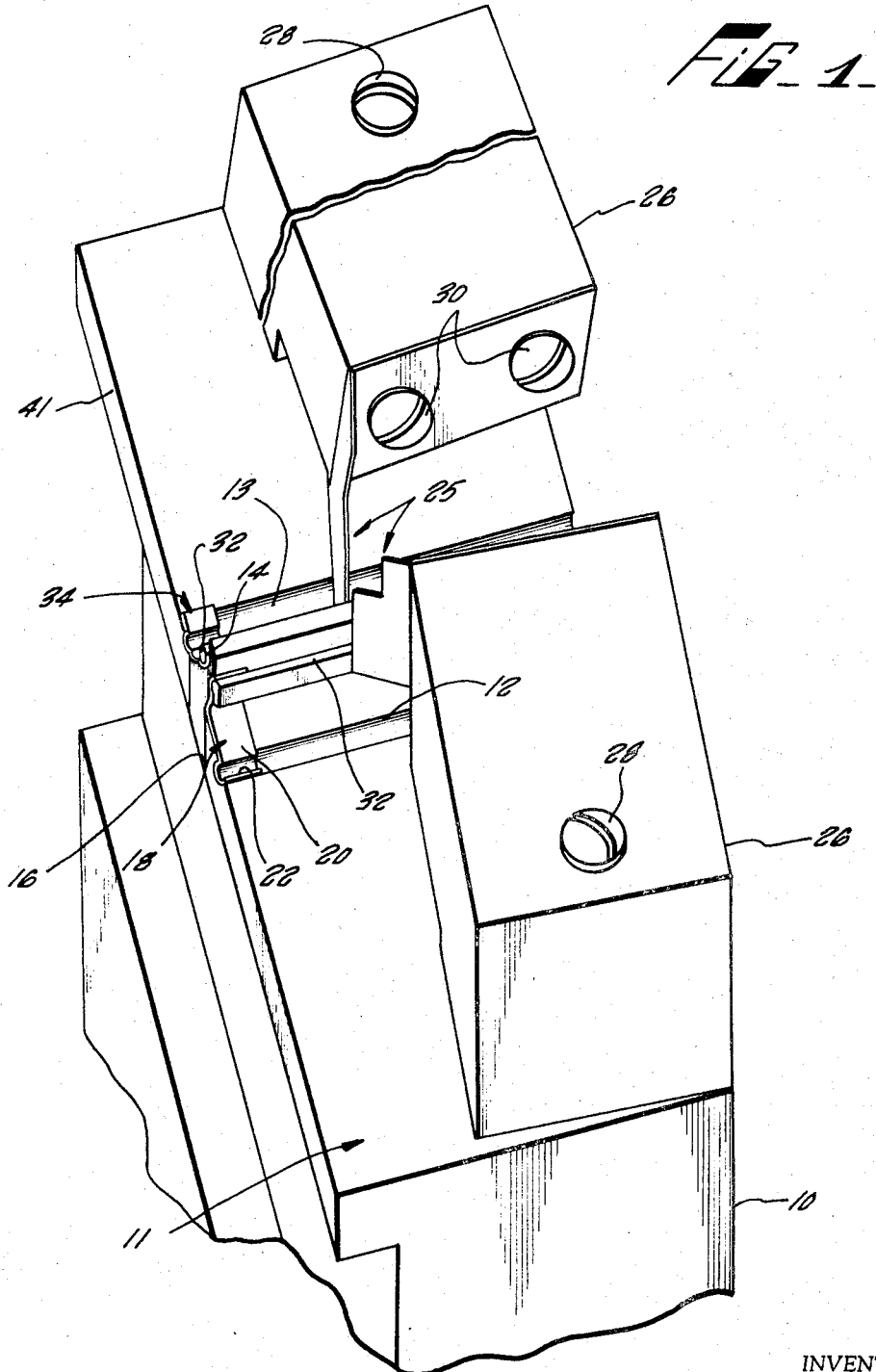
FIG. 1 is a perspective view of a pair of stationary contact strips mounted on a bottom electrode prior to posts being welded to the strips.
Figure 2:
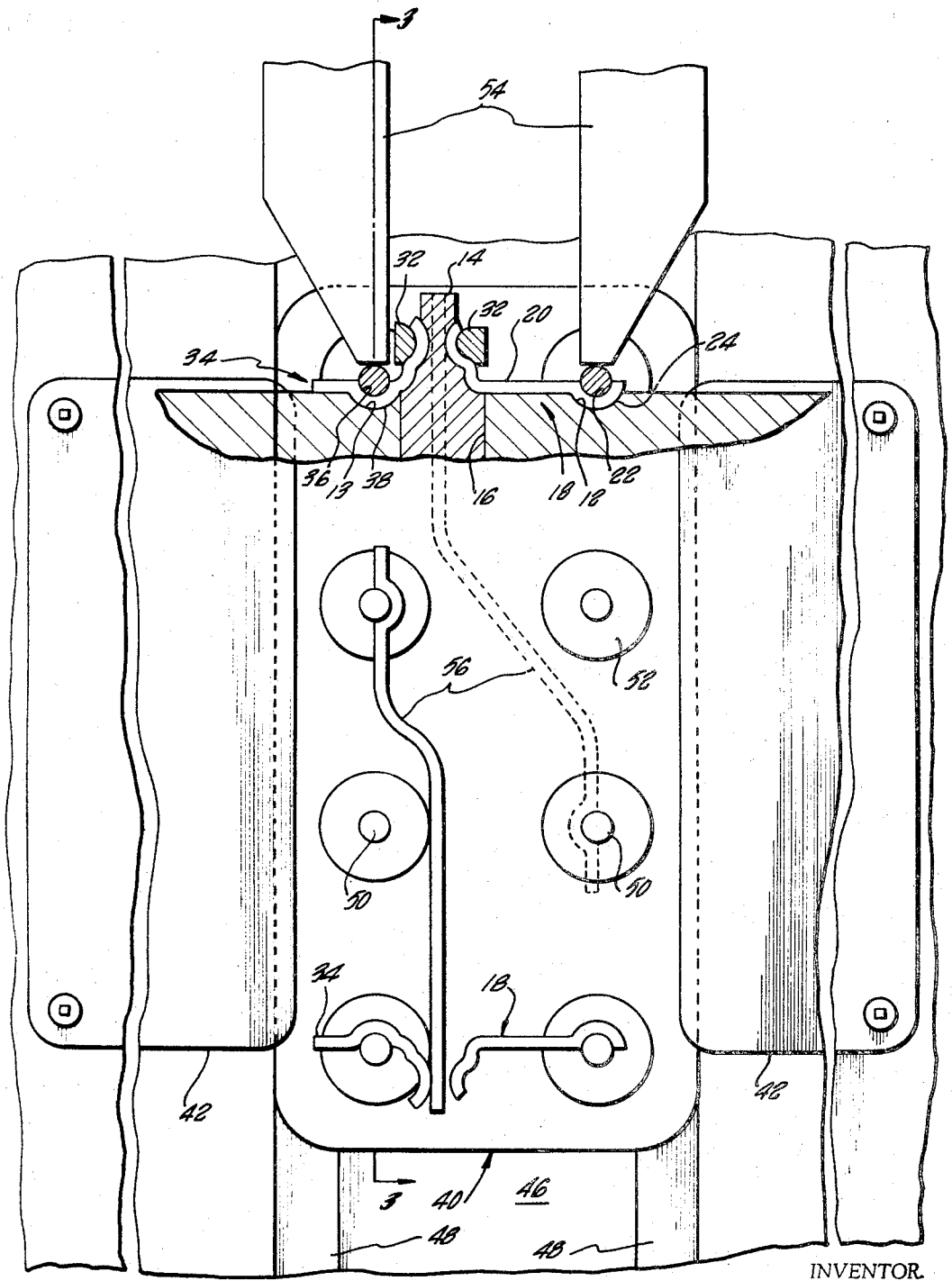
FIG. 2 is a fragmentary elevation of the strips shown in FIG. 1 having posts welded to them.

Referring to FIG. 1, an upright bottom electrode 10 has a flat top 11 which includes a pair of elongated parallel grooves 12 and 13 which are semicircular in cross section as shown best in FIG. 2. An elongated stationary upright guide 14 of electrically insulating material such as Bakelite is mounted in an elongated slot 16 located between and parallel to grooves 12 and 13. The slot 16 is located nearer groove 13 than groove 12.

A long stationary contact strip 18 in the form of an elongated strip of electrically-conductive material rests on top of the bottom electrode. As shown best in FIGS. 1 and 2, the long stationary strip includes a central portion 20 which lies in a major plane parallel to and on the top of he bottom electrode. The right (as viewed in FIG. 2) end of the long stationary contact strip is deformed downwardly to be displaced out of the major plane of the strip and form an upwardly-opening recess 22 which is of a length substantially longer than its transverse dimension semicircular in cross section and terminates at its upper edge in the major plane of a long strip. The bottom of the strip under the recess has an elongated concave protrusion 24 which is semicircular in cross section and which has the same radius of curvature as the groove 12 so that the protrusion makes a snug fit in the groove. The left (as viewed in FIG. 2) end of the long strip is curved upwardly and has a slightly irregular outer surface which matches the adjacent surface of the stationary guide so the guide holds the left end of the long strip firmly in place.

As shown best in FIG. 1, first elongated cantilever spring 25 is secured at one end to a spring block 26 of electrically-insulating material secured by a screw 28 to the top of the bottom electrode. The spring 25 is secured at one end by screws 30 to an end of the spring block holder overlying the groove 12. A finger 32 extends horizontally from the cantilever spring parallel to the groove 12 and presses the upwardly-curved left (as viewed in FIG. 2) end of the long contact strip firmly against the stationary guide.

A short stationary contact strip 34 is clamped against the other face of the stationary guide by a finger 32 on a second cantilever spring 25 secured at one end by screws 30 to a second spring block holder 26 fastened by a screw 28 to the top of the bottom electrode.

The short contact strip is similar to the first except the short strip has a concave recess 36 and convex protuberance 38 in its intermediate portion rather than at one end. The protuberance 38 fits in the groove 13 on the left (as viewed in FIG. 2) side of the stationary guide.

A header base 40 in the shape of a flat rectangular plate is clamped along its long edges by leaf springs 42 secured by screws 43 to a fixture 44 which has an elongated notch 46 in its face to receive the header base, which rests on an elongated shoulder 48 on each side of notch 46.

A plurality of elongated cylindrical posts 50 or wires of the electrically-conductive material are sealed through electrical insulators 52 in the base 40, and the bottom electrode is of reduced thickness to provide a horizontal overhanging work shelf 41 to support the parts to be welded.

As shown in FIGS. 2 and 3, the fixture and base are located so that the two top posts each fit in a respective recess in a strip. The bottom electrode is rigidly held in a fixed position, and so is the fixture. The base makes a sliding friction slip fit under the springs 42 along shoulders 48, but cannot move laterally with respect to the shoulders.

A separate respective upper electrode 54 is brought to bear on the upper side of a respective post 50, which is forced into a respective recess. The recesses in the strips and the base are accurately and rigidly held in their required respective positions. If the posts are slightly misaligned with respect to being truly perpendicular to the base, they are deflected laterally as directed by the mating surfaces of the posts and the recesses so that the posts are forced to the desired axial alignment with the recesses as they are driven into them. After appropriate welding pressure is attained, welding current is passed through the electrodes so that the posts are bonded to their respective strips. As shown best in FIG. 2, the recessed portion of each strip encompasses substantially one-half of the circumference of the post in it. Thus, the post is not only accurately aligned with respect to the base and strips, but it is also firmly bonded to its respective strip over a substantial area throughout their common length. The contact strips are held by the fingers with a snug friction fit, but easily slide free when the fixture and base are moved to the right (as viewed in FIG. 3).

For the particular relay header base shown in FIG. 2, a similar operation is repeated at the opposite end of the base to weld short and long contacts to posts there.

Thereafter, moving blade strips 56 are welded to intermediate posts in the header base as shown in FIG. 4. An elongated recess 58 is formed adjacent one end of a moving blade strip to produce a convex protuberance 60 which fits in a convex recess 61 in the upper surface of another bottom electrode 62. The moving blade strip is clamped to the top of the bottom electrode by a pair of springs 63, 64 on opposite sides of a semicircular recess 65 formed in the top of the moving blade strip. A post 50 is driven into the recess 65 by a top electrode 66 and welded in the position shown so that the end of the moving blade strip remote from the post terminates against a long contact and is spaced from a short contact.

The base is rotated 180° from the position shown in FIG. 4, and a second moving blade strip is welded in the phantom line position shown in FIG. 4. The base is now ready for further assembly in a relay contact switch (not shown).

From the foregoing description, it will be appreciated that the welding in accordance with this invention not only produces parts of improved strength and reliability because of the better contact between the posts and the strips, but the posts and the strips are forced to assume accurate alignment for better switch reliability and operation.

I claim:

1. An assembly comprising a strip of electrically-conductive material, the strip having a recess in its surface, the recess having portions diverging toward the said surface and a length substantially greater than its maximum transverse dimension, a post of electrically-conductive material disposed in the recess and extending over substantially the full length thereof, the post having converging portions which mate and are in contact over a substantial area with the said diverging portions and over the full length of the post disposed in the recess, a portion of the post disposed in the recess having been aligned with the recess by forcing the post toward and into engagement with the recess, and a resistance weld bonding the post to the strip over a substantial portion of the area of contact between them.

2. An assembly comprising a strip of electrically-conductive material, the strip having a recess in its surface, the recess being in the form of about one-half of a cylinder, a post of electrically-conductive material disposed in the recess, the post being cylindrical with a radius of curvature substantially the same as that of the recess so that post and strip are in contact over substantially one-half the post circumference throughout a common length between the post and the recess after the post and the strip have been axially aligned by forcing them toward and into engagement with each other, and a resistance weld bonding the post to the strip over a substantial portion of the area of contact between them.

3. The method of welding a strip of electrically-conductive material to a post of electrically-conductive material, the post being mounted on a base and movable with respect to it, the strip having a recess in its surface with portions of the recess diverging toward the said surface, the post having converging portions shaped to mate with and be in contact over a substantial area with the said diverging portions, the method comprising holding the base in a fixed position relative to the post, disposing the post and strip adjacent each other with converging portions on the post extending into the recess in the strip, forcing the strip and post together to move the post relative to the base and mate the converging and diverging portions in contact with each other over a substantial area, and resistance welding the post and strip together.

4. The method of welding a strip of electrically-conductive material to a post of electrically-conductive material, the post being mounted on a base and movable with respect to it, the strip having a recess in its surface with portions of the recess diverging toward the said surface, the post having converging portions shaped to mate with and be in contact over a substantial area with the said diverging portions, the method comprising holding the base in a fixed position relative to the post, disposing the post and strip adjacent each other with converging portions on the post extending into the recess in the strip, moving the base and strip relative to each other to force the strip and post together to move the post relative to the base and mate the converging and diverging portions in contact with each other over a substantial area, and resistance welding the post and strip together.

5. The method of welding a strip of electrically-conductive material to a post of electrically-conductive material, the post being mounted on a base and movable with respect to it, the strip having a recess in its surface with portions of the recess diverging toward the said surface, the post having converging portions shaped to mate with and be in contact over a substantial area with the said diverging portions, the method comprising holding the base in a fixed position relative to the post, disposing the post and strip adjacent each other with converging portions on the post extending into the recess in the strip, moving the base and post relative to the strip to force the strip and post together so the converging and diverging portions are in contact with each other over a substantial area, restraining the base and strip against movement relative to each other in a direction transverse to the direction of movement of the post into the recess to displace the post transversely relative to the base to fit into the recess, and resistance welding the post and strip together.

6. A relay switch component assembly comprising a base, first and second cylindrical posts permanently mounted on the base and spaced from each other, the posts being electrically conductive, a first electrically-conductive strip having a recess of substantially the same curvature as the first post and disposed to be in close contact with about half the circumference of the first post, a first resistance weld bonding the first post and strip together over a substantial portion of the area of contact between them, a second electrically-conductive strip having a recess of substantially the same curvature as the second post and disposed to be in close contact with about half the circumference of the second post, and a second resistance weld bonding the second strip and post together over a substantial portion of the area of contact between them, a portion of the second strip extending away from the first post and disposed closely adjacent, but out of electrical contact with, the first strip.

References Cited
UNITED STATES PATENTS

| | | | |
|---|---|---|---|
| 2,779,094 | 1/1957 | Christoffel | 29—624 XR |
| 3,216,089 | 11/1965 | Dettman | 317—101 XR |

DARRELL L. CLAY, *Primary Examiner.*